Patented June 23, 1953

2,643,266

UNITED STATES PATENT OFFICE 2,643,266

PRODUCTION OF NITROGEN CONTAINING COMPOUNDS FROM AMMONIA AND OLEFINS

John W. Teter, Chicago, Ill., assignor to Sinclair Refining Company, New York, N. Y., a corporation of Maine No Drawing. Original application July 18, 1945, Serial No. 605,832. Divided and this application April 5, 1946, Serial No. 659,890.

2 Claims. (Cl. 260—465.3)

This invention relates to improvements in the production of nitrogen-containing products, particularly nitriles, by the direct, catalytic reaction of olefins with ammonia. It includes improvements in the process, and also improved catalysts which are particularly effective in promoting the production of nitriles of low molecular weight, such as aceto- and propionitrile while repressing to a substantial extent pyrolytic decomposition reactions of the hydrocarbon, e. g., cracking and polymerization, with production of hydrocarbon polymer, tarry and carbonaceous material and the like. This application is a division of my co-pending application Serial No. 605,832, filed July 18, 1945, now abandoned.

The production of nitrogen-containing products, particularly nitriles, by the catalytic reaction of ammonia with olefins, and catalysts which are useful for that purpose, have been described in my applications Serial No. 464,636, filed November 5, 1942 now Patent 2,381,709; 365,561, filed November 13, 1940 now Patent 2,381,470; 365,562, filed November 13, 1940 now Patent 2,381,471; 365,563, filed November 13, 1940 now Patent 2,392,107; 444,094 filed May 22, 1942 now Patent 2,418,562; 444,095, filed May 22, 1942 now abandoned; 444,096, filed May 22, 1942 now Patent 2,406,929; and 444,097, filed May 22, 1942 now Patent 2,398,899. In such processes, temperatures ranging from about 400° F. to about 725° F. are used, temperatures of about 640° to 650° F. being particularly useful where the olefin is propylene, with somewhat higher temperatures representing the most effective range where the olefin is ethylene. The catalysts which have been described as useful in this procedure include reduced metal oxides deposited on an inert carrier, such as diatomaceous earth, heat treated magnesol, heat treated bentonite, etc. The easily reducible materials cobalt, nickel and iron have been described as most useful with cobalt outstanding.

The present invention provides improvements in this process which involve the use of specially prepared cobalt catalysts. It includes such cobalt catalysts and their preparation. The advantages of the process of the invention, and the use of the catalyst, lie in an increased production of nitrogen-containing products, particularly the desired nitriles, based upon olefin feed and olefin consumed, long catalyst life, and decreased production of secondary or waste products.

The catalyst used in the practice of the invention is a reduced cobalt catalyst, prepared by the reduction of cobalt oxide deposited on an inert carrier, advantageously diatomaceous earth. The catalyst may include oxides of other easily reducible metals, such as iron, nickel, manganese, copper and zinc. The sodium content of the catalyst must be low, below 1%. The sulfate content must also be low, not exceeding about 0.2% and advantageously not exceeding about 0.1%. The chloride content must also be low, not exceeding about 0.1%.

The new catalyst is advantageously prepared in the form of small agglomerates or granules, as by pelleting or extrusion, after the deposition of the metal on the inert carrier. It is necessary, to have a catalyst of appropriate activity, to control the degree of compression of the pellets or density of the agglomerates so that they will have the proper degree of porosity. With diatomaceous earth as the carrier, and with about 40% of the total catalyst mass cobalt, calculated as metal, bulk apparent densities, for pellets in the form of right cylinders having a height about equal to diameter, may range from about .75 to about 1.3, with best results being obtained with a product having a bulk apparent density of about .9 corresponding to a pellet apparent density of about 1.3. Extruded catalysts, that is, catalysts in the form of agglomerates produced by extrusion of a wet mass through orifices and cutting off of the cylinders into small lengths, may have similar densities.

The granules or pellets may be of various sizes, the smaller the pellet consistent with the necessary flow of the material through the catalyst bed and with cost of production, the better the results. With a pelleted catalyst, a pellet size of about 1/8" diameter is about the smallest which is advisable from a cost standpoint, and gives very good results. Considerably larger pellets ranging up to 3/8" or even larger, may, however, be used. With extruded catalysts, the agglomerate size may be somewhat smaller than 1/8", for example, 1/16", within the range of feasibility from a cost standpoint, and give good results.

For a highly effective catalyst of the type contemplated by the present invention, it is necessary that the catalyst have a large surface area. Thus, the most effective catalysts, before use, have surface areas as determined by the nitrogen absorption isotherm procedure calculated by the Brunauer, Emmett and Teller method (J. A. C. S. vol. 60, p. 309, 1938) in excess of 120 and advantageously in excess of 150 more square meters per gram. One particularly effective catalyst, produced as hereafter described, after reduction and before use had a surface area of about 217 square meters per gram as determined in this way. After considerable use, the surface area so determined becomes considerably reduced, and may be as low as 50 or 60 square meters per gram, the catalyst nevertheless retaining substantial activity. The catalysts of the present invention have a surface area as determined in this way, after reduction but before use, of at least 120 square meters per gram.

The catalysts of the invention are produced by depositing cobalt oxide on the inert carrier, and subjecting the resulting product to reduction. The exact structure of the resulting reduced cobalt is not known. Magnetic tests indicate that it is ferromagnetic and contains considerable metallic cobalt. X-ray diffraction patterns made on the powdered material, by the usual technique, indicate that the product is cobaltous oxide (CoO) together with a little cobaltic oxide ($Co_3O_4$). Electron diffraction patterns, obtained by passing the electron stream through the powdered material supported on a copper screen indicate the presence of cobaltous (CoO) oxide, but the electron penetration is not thought to exceed 400 Å., and is at most indicative of the nature of the surface layer. From these determinations, it would appear possible that the active catalyst is cobalt metal activated by cobaltous oxide, or that it is the freshly reduced cobaltous oxide itself. It is noteworthy that it appears to be necessary to introduce a small quantity of water along with the hydrocarbon and ammonia feed, as described in my application Serial No. 558,486 to maintain the catalyst at its greatest activity, a further indication that the active material is either an oxide of cobalt or an admixture of the metal with one or more of its oxides in some sort of equilibrium influenced by the water. It is also possible that the carrier or the combination of the carrier with the catalytic material contains adsorbed water which is required to be present for maximum activity. This speculation as to the nature of the active catalytic material is not intended to limit or otherwise affect the scope of the invention. The conditions which are necessary and sufficient for the catalyst of the invention are:

(1) An inert carrier such as diatomaceous earth.

(2) Reduced cobalt deposited on the carrier, with or without the presence of a promoter or other easily reducible metal.

(3) A large surface area of at least 120 square meters per gram of catalyst.

(4) An appropriate degree of porosity, corresponding to an apparent bulk density of the catalyst granules between .75 and 1.3.

(5) A sodium content not in excess of 1%.

(6) A sulfate content not in excess of 0.2% and advantageously below 0.1%.

(7) A chloride content not in excess of 0.1%.

This improved catalyst is advantageously prepared by depositing the cobalt on the inert carrier by reaction of a soluble cobalt salt with caustic soda or sodium carbonate in the presence of the slurried carrier. Cobalt sulfate, because of cost, is advantageously used, and to permit the washing of the resulting product to remove sulfate down to the very low levels required, the precipitation is carried out by adding the solution of the cobalt salt to a slurry of the carrier in aqueous sodium carbonate or caustic soda. By avoiding any excess of cobalt sulfate at any time, it appears to be possible to avoid the formation of basic sulfates, which cannot be removed by washing or at least are removable by washing only with great difficulty. After such precipitation, the product is washed using demineralized water having a very low content of sulfate and chloride ions, to remove sodium, sulfate, and other soluble materials, and is then calcined, pelleted and reduced. A typical preparation of a catalyst which is highly active, and has a long catalyst life, is illustrated by the following example:

*Example.*—87.2 lbs. of Celite No. 337 (diatomaceous earth), passing a 200 mesh screen, were mixed with 80 gallons of a sodium carbonate solution containing 160 lbs. of anhydrous sodium carbonate. The slurry was settled overnight and then heated to 90° C. with live steam. To it was added 80 gallons of a solution containing the equivalent of 185 lbs. anhydrous cobalt sulfate (70 lbs. cobalt as metal) over a period of ½ hour with intermittent high speed agitation. The mixture was then agitated for 12 minutes, and then pumped to the filter press. The cake in the filter press was washed with water, removed, reslurried and again pumped to the press. This washing procedure was repeated until a total of five pressings had been made. All washing was carried out with demineralized water having a hardness of 3 to 4 parts per million of solids with chloride below 3 parts per million and the sulfate below 1 part per million. The filter cake was then dried at 90° C., ground in a cone-type crusher to 35 mesh or finer and calcined for 2 hours at 650° F. in a rotary gas fired calciner. The calcined product was then mixed with 4% of graphite and pelleted in ¼" diameter pellets. These pellets were then reground to pass a 35 mesh screen and repelleted as ⅛" diameter pellets, the compression being such as to give pellets having an apparent bulk density of about 0.9. Sulfate analysis indicated showed less than 0.01% of sulfate. The sodium content was about 0.2. Chloride was present as a mere trace.

The pellets were then charged into a reactor and reduced. The reduction was carried out with the use of alternate introduction of ammonia as a purge and hydrogen for reduction. Initially ammonia was passed in under a pressure of 3000 lbs. for a period of 2 hours at a rate of about 2 cubic feet per liter of catalyst per hour. Hydrogen was then passed in at atmospheric pressure for 50 hours at the same rate. This was followed by an ammonia purge at 3000 lbs. for 2 hours, a hydrogen reduction at 100 lbs. for 25 hours, and ammonia purge at 3000 lbs. for 2 hours, a hydrogen reduction at 1000 lbs. for 25 hours, and an ammonia purge at 3000 lbs. for 6 hours, the temperature being maintained at about 640° F. during the entire operation.

The catalyst after this reduction operation had an apparent bulk density of about 0.9, a surface area as determined by the procedure above stated of about 217 square meters per gram, and had the response to X-ray diffraction and electron diffraction tests indicated above. It was pyrophoric and ferromagnetic indicating the presence of metallic cobalt.

After the reduction of the catalyst, a mixture of hydrocarbon, ammonia and a small quantity of water was passed into the reaction vessel while maintaining the temperature at 640° F. and a pressure of about 1500 lbs. per square inch. The hydrocarbon feed contained 8.5% ethylene plus ethane, 41% propylene, 48.4% propane and 2.1% $C_4$ hydrocarbons. The olefin space velocity (volume liquid feed/volume catalyst/hour) was 0.262. The quantity of ammonia was 11.56 moles per mole of olefin and the quantity of water 0.0077 mole per mole of olefin. The reactor effluent was fractionated, the ammonia separated, and recycled. The percentage of nitrogen-containing products, based on propylene charged and calculated as propionitrile was 28.36%. The percentage of hydrocarbon polymer was 2.50%. The operation was carried out with alternate processing and reactivation of the catalyst, the process being carried on for 6 hours and the catalyst being then reactivated. The temperature for reactivation was 626° F., and the reactivation procedure consisted in passing hydrogen at 3000 lbs. through the catalyst bed at the rate of 2 cubic feet per hour per liter of catalyst, followed by a purge with ammonia at 3000 lbs. pressure.

Other runs with a similar feed composition and olefin space velocities varying from .108 to .651 gave similar results, other conditions being maintained substantially the same.

I claim:

1. In a process for producing organic nitrogen-containing products including nitriles from ammonia and olefin, the improvement which consists of passing a mixture containing ammonia and the olefin the ammonia being present in substantial excess through a bed of a catalyst effective for the production of organic nitrogen-containing products by the direct reaction of ammonia with olefins, said catalyst being in the form of pellets or granules, each pellet or granule consisting of an agglomerate of reduced cobalt oxide deposited on diatomaceous earth, said pellets or granules having apparent bulk density between 0.75 and 1.3, a surface area as determined by nitrogen absorption isotherm procedure with calculation by the Brunauer, Emmett and Teller method in excess of 120 square meters per gram, a sodium content not in excess of about 1.0%, a sulfate content not in excess of about 0.2% and a chloride content not in excess of about 0.1%.

2. In a process for producing organic nitrogen-containing products including nitriles from ammonia and olefin, the improvement which consists of passing a mixture containing ammonia and the olefin the ammonia being present in substantial excess through a bed of a catalyst effective for the production of organic nitrogen-containing products by the direct reaction of ammonia with olefins, said catalyst being in the form of pellets or granules, each pellet or granule consisting of an agglomerate of reduced cobalt oxide deposited on diatomaceous earth, said pellets or granules having apparent bulk density between 0.75 and 1.3, a surface area as determined by nitrogen absorption isotherm procedure with calculation by the Brunauer, Emmett and Teller method in excess of 120 square meters per gram, a sodium content not in excess of about 1.0%, a sulfate content not in excess of about 0.1% and a chloride content not in excess of about 0.1%.

JOHN W. TETER.

References Cited in the file of this patent

UNITED STATES PATENTS

| Number | Name | Date |
|---|---|---|
| 2,013,066 | Porter | Sept. 3, 1935 |
| 2,040,233 | Adkins | May 12, 1936 |
| 2,244,196 | Herbert | June 3, 1941 |
| 2,274,639 | Scheuerman et al. | Mar. 3, 1942 |
| 2,381,472 | Teter | Aug. 7, 1945 |
| 2,381,473 | Teter | Aug. 7, 1945 |
| 2,397,705 | Teter | Apr. 2, 1946 |
| 2,398,899 | Teter | Apr. 23, 1946 |
| 2,479,879 | Teter | Aug. 23, 1949 |